(12) United States Patent
LaBrier et al.

(10) Patent No.: US 11,963,268 B2
(45) Date of Patent: Apr. 16, 2024

(54) RESISTANCE HEATER ROD AND METHOD OF MAKING SUCH

(71) Applicant: Oregon State University, Corvallis, OR (US)

(72) Inventors: Daniel LaBrier, Pocatello, ID (US); Wade R. Marcum, Corvallis, OR (US); James Nylander, Tualatin, OR (US); Aaron W. Weiss, Corvallis, OR (US); Salem Sharaf, Corvallis, OR (US)

(73) Assignee: OREGON STATE UNIVERSITY, Corvallis, OR (US)

( * ) Notice: Subject to any disclaimer, the term of this patent is extended or adjusted under 35 U.S.C. 154(b) by 963 days.

(21) Appl. No.: 16/904,472

(22) Filed: Jun. 17, 2020

(65) Prior Publication Data
US 2020/0402678 A1 Dec. 24, 2020

Related U.S. Application Data

(60) Provisional application No. 62/863,351, filed on Jun. 19, 2019.

(51) Int. Cl.
| | |
|---|---|
| *H05B 1/02* | (2006.01) |
| *H05B 3/00* | (2006.01) |
| *H05B 3/14* | (2006.01) |
| *H05B 3/40* | (2006.01) |
| *G21C 17/00* | (2006.01) |

(52) U.S. Cl.
CPC ......... *H05B 1/0291* (2013.01); *H05B 3/0061* (2013.01); *H05B 3/14* (2013.01); *H05B 3/40* (2013.01); *G21C 17/001* (2013.01)

(58) Field of Classification Search
None
See application file for complete search history.

(56) References Cited

U.S. PATENT DOCUMENTS

| 2,864,025 | A | * | 12/1958 | Foote | H01K 3/08 |
| | | | | | 313/274 |
| 2,894,166 | A | * | 7/1959 | Mohn | H01K 1/34 |
| | | | | | 338/237 |
| 2,910,605 | A | * | 10/1959 | Hodge | H01K 1/24 |
| | | | | | 313/274 |

(Continued)

FOREIGN PATENT DOCUMENTS

CN 104078087 10/2014

*Primary Examiner* — Thor S Campbell
(74) *Attorney, Agent, or Firm* — MUGHAL GAUDRY & FRANKLIN PC

(57) ABSTRACT

A resistive heater capable of delivering heat loads on the same order as those produced by in-pile nuclear fuel experiments. The heater rod provides the energy for high-temperature steady-state testing, as well as the power needed to simulate the transient pulse in the Transient Reactor Test Loop (TRTL) system. The resistive heater includes a removable housing, two or more thermal conductors in the housing; and one or more stabilizers coupled to the two or more thermal conductors to keep the two or more thermal conductors separated to avoid shorting, wherein the two or more thermal conductors are coupled to the housing via an inert gas (e.g., Helium). The two or more thermal conductors comprise a material with substantially zero infrared spectrum (e.g., sapphire, silica, or glass).

17 Claims, 8 Drawing Sheets

(56) References Cited

U.S. PATENT DOCUMENTS

| | | | | |
|---|---|---|---|---|
| 3,252,122 | A * | 5/1966 | Baxter | H05B 3/48 |
| | | | | 361/266 |
| 3,443,144 | A * | 5/1969 | Freese, Jr. | H01K 5/02 |
| | | | | 313/274 |
| 3,791,172 | A * | 2/1974 | Manfre | H01B 3/082 |
| | | | | 72/46 |
| 3,898,431 | A | 8/1975 | House et al. | |
| 4,001,547 | A * | 1/1977 | Boggs | H05B 3/82 |
| | | | | 392/501 |
| 4,112,410 | A * | 9/1978 | Wrob | H05B 3/48 |
| | | | | 338/270 |
| 4,326,122 | A * | 4/1982 | McCulloch | G21C 17/001 |
| | | | | 219/544 |
| 4,442,374 | A * | 4/1984 | Morris | H01K 9/00 |
| | | | | 313/274 |
| 4,517,448 | A * | 5/1985 | Crain | H01L 21/705 |
| | | | | 257/E21.534 |
| 4,626,665 | A | 12/1986 | Fort, III | |
| 4,710,676 | A * | 12/1987 | Morris | G03G 15/2003 |
| | | | | 313/1 |
| 5,296,686 | A * | 3/1994 | Ullrich | H05B 3/44 |
| | | | | 392/407 |
| 5,756,998 | A * | 5/1998 | Marks | H01B 13/062 |
| | | | | 65/59.27 |
| 6,189,806 | B1 * | 2/2001 | Klemm | C23C 14/24 |
| | | | | 239/82 |
| 6,713,945 | B2 * | 3/2004 | Fuchs | H01K 1/06 |
| | | | | 250/493.1 |
| 7,595,464 | B2 * | 9/2009 | Konishi | F24C 7/065 |
| | | | | 219/541 |
| 7,639,930 | B2 * | 12/2009 | Mizukawa | H01K 9/08 |
| | | | | 392/407 |
| 8,488,953 | B2 * | 7/2013 | Nakashima | H01K 9/08 |
| | | | | 392/407 |
| 9,835,497 | B2 * | 12/2017 | Gros D'Aillon | B23K 9/007 |
| 2002/0001460 | A1 * | 1/2002 | Seko | H01L 21/67103 |
| | | | | 392/407 |
| 2003/0215540 | A1 * | 11/2003 | Asai | B29C 45/73 |
| | | | | 425/547 |
| 2004/0175162 | A1 * | 9/2004 | Linow | H05B 3/0052 |
| | | | | 392/424 |
| 2005/0220492 | A1 * | 10/2005 | Curynski | G03G 15/0291 |
| | | | | 399/170 |
| 2007/0187394 | A1 * | 8/2007 | Taniguchi | B22D 17/28 |
| | | | | 219/639 |
| 2014/0151363 | A1 * | 6/2014 | Gros D'Aillon | G21C 21/02 |
| | | | | 219/541 |
| 2014/0263282 | A1 | 9/2014 | Riley et al. | |
| 2020/0402678 | A1 * | 12/2020 | LaBrier | G21C 17/00 |

* cited by examiner

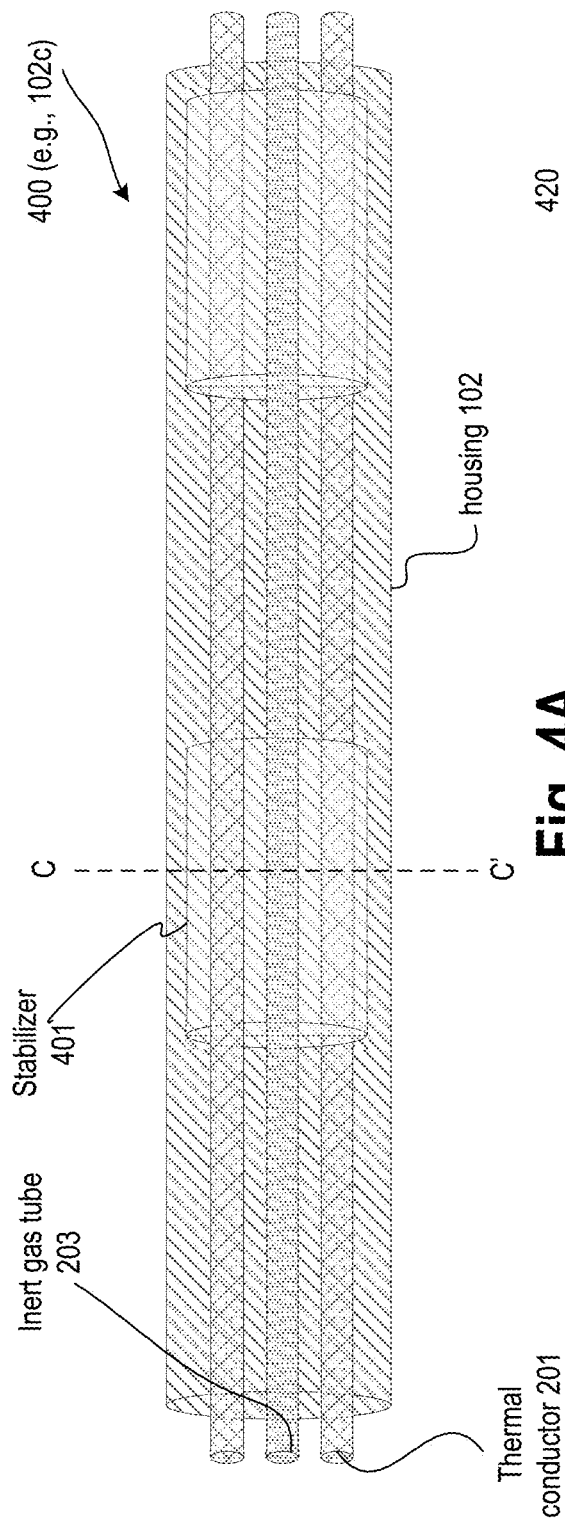
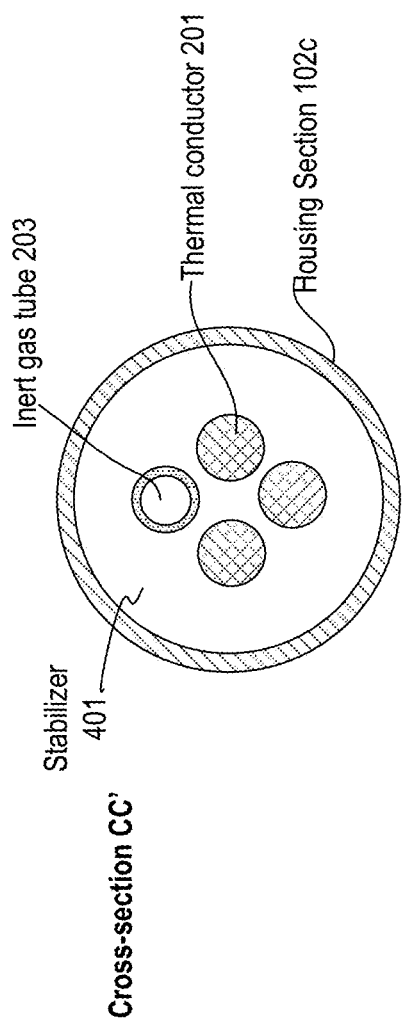
Fig. 4A
Fig. 4B

RESISTANCE HEATER ROD AND METHOD OF MAKING SUCH

CLAIM FOR PRIORITY

This application is a non-provisional of, and claims the benefit of priority to U.S. Provisional Patent Application No. 62/863,351, filed on Jun. 19, 2019, titled "RESISTANCE HEATER ROD AND METHOD OF MAKING," and which is incorporated by reference in entirety.

GOVERNMENT INTEREST STATEMENT

This invention was made with government support under Award No. DE-NE0008441 awarded by the United States Department of Energy. The government has certain rights in the invention.

BACKGROUND

Materials performance is a rapidly growing area of research and development in the nuclear industry. With the renewed emphasis on the development of advanced reactor technologies, there is renewed interest in assessing the performance of materials under normal operating conditions, and during hypothesized accident scenarios. Use of nuclear test facilities can be prohibitively expensive and difficult to schedule due to the increasing demand for test performance data. The ability to stress materials in a dynamic facility, with operating conditions similar to those of a nuclear reactor, without radiological concerns, is of great benefit to the entire nuclear community. Additionally, such a capability can help to provide performance data necessary to qualify materials for use within the future nuclear fleet.

One of the greatest challenges in simulating nuclear fuel rod experiments is producing the power density that is representative of an actual rod in an active fuel assembly. There is a need within the nuclear fuels community to develop and utilize a tool that can produce appropriate power densities for nuclear fuel rods while having no risk of radioactivity or criticality concerns, at a similar size and form factor of an actual fuel rod. For example, this technology would allow an entity to test the safety margins for a new type of cladding under prototypical reactor conditions (e.g., flow, pressure, temperature, etc.) with no concern for radioactive release or contamination. There would still be considerable safety concerns that need to be addressed, such as overcurrent applied to the system, catastrophic failure of the heating mechanism, and so on.

Metal-encased resistive heaters, also referred to as cartridge heaters, are currently available. However, available models can produce power in the range of 1-10 $W/cm^2$, with some custom orders that can possibly produce up to 25-30 $W/cm^2$. These heaters are also often much larger than the standard nuclear fuel rod (or more specifically, the outer diameter of the cladding), especially for current light water reactor (LWR) technology, where the standard size is a 0.9525 cm outer diameter cladding tube. Such small sized (by diameter) cartridge heaters typically cannot provide power densities above 15 $W/cm^2$.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 4A-B illustrate a section of the heating rod assembly apparatus inside a stabilizer, and corresponding cross-sectional view, respectively, in accordance with some embodiments.

DETAILED DESCRIPTION

Figure 1:
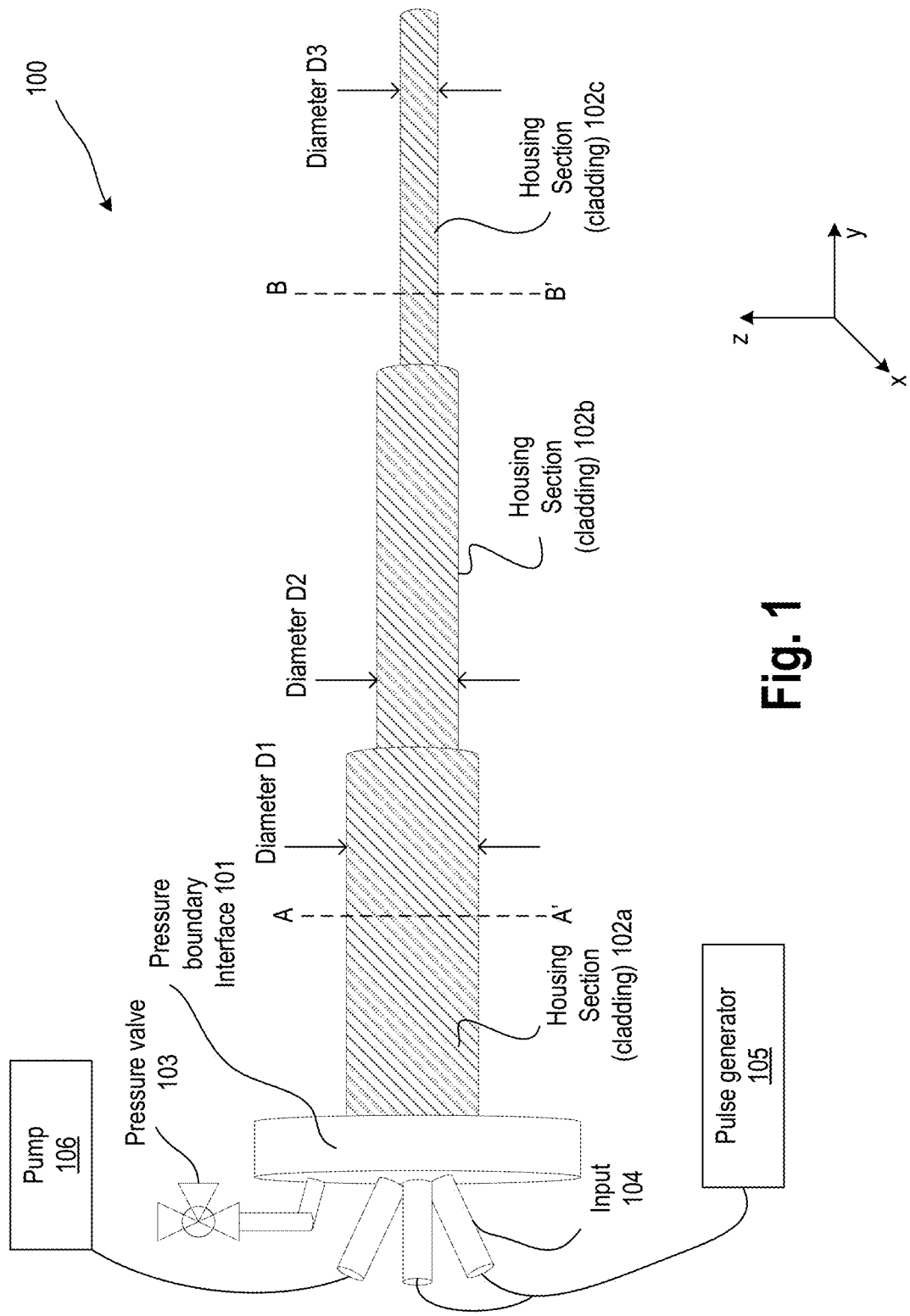
FIG. 1 illustrates a heating rod assembly apparatus, in accordance with some embodiments.

Some embodiments provide a resistive heater capable of delivering heat loads on the same order as those produced by in-pile nuclear fuel experiments. The heater rod provides the energy for high-temperature steady-state testing, as well as the power needed to simulate the transient pulse in the Transient Reactor Test Loop (TRTL) system.

In some embodiments, the resistive heater comprises a housing including a cladding material. The housing or cladding is removable to allow usage of different cladding material and/or thicknesses for different requirements of heat transfer. Examples of cladding material include stainless steel, incoloy, or nickel-based alloy. The resistive heater further comprises two or more thermal conductors in the housing and one or more pucks or stabilizers coupled to the two or more thermal conductors to keep the two or more thermal conductors separated to avoid shorting, wherein the two or more thermal conductors are coupled to the housing via an inert gas. In some embodiments, the two or more thermal conductors comprise a material with substantially zero infrared spectrum. Examples of such material exhibit high electrical resistivity and low thermal resistivity. For instance, sapphire, silica, or glass exhibit high electrical resistivity and low thermal resistivity.

In some embodiments, the two or more thermal conductors are covered or surrounded by materials that exhibit high electrical resistivity and low thermal resistivity. In some embodiments, the inert gas in the housing comprises Helium (He). Other inert gases may be used. In some embodiments, the one or more pucks or stabilizers comprise thermoplastic polyester (e.g., polylactic acid) or ceramic. In some embodiments, the resistive heater comprises at least first and second sections with first and second diameters, respectively, wherein the second diameter is shorter than the first diameter, and wherein the two or more thermal conductors pass through the first and second sections. In some embodiments, the resistive heater comprises an interface coupled to the first section, wherein the interface comprises holes to access the first and second thermal conductors, and wherein the interface is to establish a pressure boundary for the first and second sections. In some embodiments, the resistive heater comprises a pipe in the housing, wherein the pipe has a first opening and a second opening, wherein the first opening is to receive the inert gas, and wherein the second opening is to provide the suppled inert gas in the housing. In some embodiments, a pressure regulator is provided to control pressure of the inert gas in the housing.

After the inert gas is injected, air in the housing is pushed out, and the pressure of the inert gas is set to a desired level (e.g., a level that keeps the integrity of the housing), a pulse generator is electrically coupled to the resistive heater. The pulse generator generates a current and/or voltage pulse. The current and/or voltage pulse are received by the two or more thermal conductors 201. The pulse is wide enough in time to cause the two or more thermal conductors to radiate heat. In one example, the heater rod system can deliver more than 500 kW, with a power density of greater than 2.5 MW/m$^2$, of electrical power to the rod on an order of tens of milliseconds. Other technical effects will be evident from the various figures and embodiments.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

FIG. 1 illustrates a heating rod assembly apparatus 100, in accordance with some embodiments. In some embodiments, apparatus 100 comprises pressure boundary interface 101, a plurality of housing sections 102 (e.g., 102a, 102b, 102c), pressure valve 103, input tubes 104, pulse generator 105, and pump 106. Pressure boundary interface 101 separates the controlling means such as pressure valve 103, input tubes 104, pulse generator 105, and pump 106 from the high temperature environment of the heating rod comprising sections 102a, 102b, and 102c.

The heating rod part of assembly apparatus 100 comprises the plurality of housing sections 102 that model a nuclear reactor rod. In some embodiments, the housing sections (e.g., 102a, 102b, 102c) comprise a cladding material (e.g., one or more of stainless steel, incoloy, or nickel-based alloy). Other examples of cladding material are zircalloy 2 and zircalloy 4 (having melting point of 1850 C).

These alloy are used in Light Water Reactor (LWR) fuel cladding and interact very little with the neutrons in a reactor core. These alloys are also high strength and highly corrosion resistant. Other examples of cladding materials include a material with low neutron interaction probability (usually a low thermal neutron cross section), that also has high corrosion resistance (e.g., local oxidation of 0.03%), and can withstand high temperatures (e.g., about 660 C and above) while maintaining its strength. For example, Zirconium 0.18 barn, iron 2.4 barn, or nickel 4.5 barn can be used as cladding materials. In some embodiments, lower value of Zirconium is used because it means the neutrons interacting in the fuel are much more likely to pass straight through the cladding material whereas they are more likely to interact with cladding materials containing iron and nickel.

Here, the term housing and cladding are interchangeably used to describe the outer covering of heater rod. In various embodiments, the housing is replaceable. For example, depending on the amount of heat radiation desired from the heating rod, different materials for cladding and/or different thicknesses for the cladding can be used. As such, apparatus 100 provides the flexibility to test various heating scenarios.

While various embodiments illustrate three housing sections, any number of housing sections may be used. The housing sections gradually taper from a higher diameter section to a lower diameter section. In this example, housing section 102a has a diameter D1, housing section 102b has a diameter D2, and housing section 102c has a diameter D3, where D1 is greater than D2, and D2 is greater than D3. The range for diameter D1 is 2 cm to 5 cm. The range for diameter D2 is 2.4 cm to 2.9 cm. The range for diameter D3 is in the range of 0.8 cm to 1 cm. One reason for tapered diameters is to increase the heat density in the housing sections as the diameter reduces. In some embodiments, instead of the multiple sections, the rod diameter is homogenous throughout. A smaller diameter results in higher heat density on cladding 102. Another reason for having larger diameters above the heater rod section are to allow larger diameter wire to be used in these regions where heat generation is not desired (note, greater wire diameter results in lower resistance and less heat generated for a given current).

In some embodiments, pressure valve 103 is a pressure regulator to control pressure of an inert gas in the housing. Pump 106 and/or another pressure valve is used to inject the inert gas into the housing. Pressure valve 103 removes excess inert gas from the housing to maintain a desired pressure of the inert gas. In some embodiments, the inert gas comprises Helium. The inert gas is a good thermal conductor.

The housing sections include two or more thermal conductors which comprise a material with substantially zero infrared spectrum. Examples of material with substantially zero infrared spectrum include sapphire, silica, or glass. These two or more thermal conductors are connected to the input tubes 104, which in turn are coupled to a pulse generator 105. Pulse generator generates current and/or voltage pulses that cause the two or more thermal conductors to heat up. The duration of the pulses controls the heating and thus the power density. The heat generated by the thermal conductors is conducted to the housing via the inert gas. The inert gas provides a near instantaneous transfer of heat to the housing. As such, the heating rod behaves more closely to a nuclear reactor rod.

Investigating high-powered phenomena or crisis events, such as the onset of dryout, is difficult to perform experimentally under prototypical conditions due to the lack of an appropriate internal heating device. The heater assembly apparatus 100 described herein is configured to perform tests on nuclear cladding materials in as realistic an environment as possible, short of performing the tests inside of a transient reactor facility, such as the Transient Reactor Test (TREAT) facility at Idaho National Laboratory (INL). The removable cladding 102 (e.g., 102a, 102b, 102c) allows for testing various cladding material under extreme heating conditions. The results produced by tests performed using heating rod assembly apparatus 100 support the development of a flowing water loop concept that has been designed for implementation in the TREAT facility.

The Transient Reactor Test Loop (TRTL) facility at Oregon State University (OSU) is designed to perform experiments that investigate the properties of materials during transient power conditions. The TRTL facility is currently participating in an experimental campaign aimed at investigating boiling crisis phenomena for Accident Tolerant Fuel (ATF) concept materials. With the ability to stably maintain steady state conditions of a pressurized water reactor (PWR) (i.e., 280° C. and 15.5 MPa) the high-wattage heater rod apparatus 100 imparts bursts of thermal energy for short periods (0.1-10 seconds) to the coolant. The facility observes phenomenology associated with boiling crisis events, such as onset of the departure of nucleate boiling (DNB) on the outer surface of the cladding of apparatus 100 due to reaching transient-induced critical heat flux (CHF).

Figure 2:
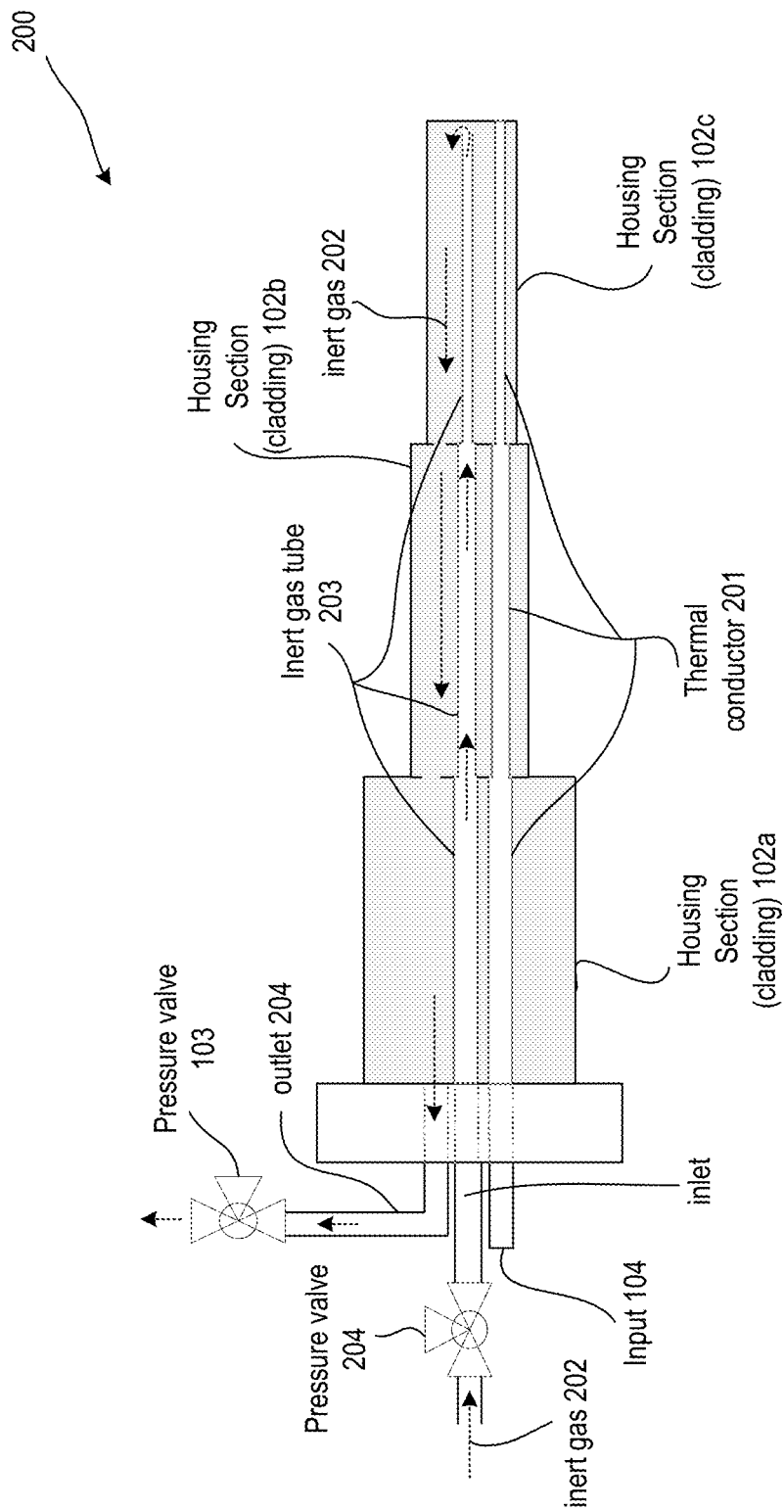
FIG. 2 illustrates an interior configuration of the heating rod assembly apparatus, in accordance with some embodiments.

FIG. 2 illustrates an interior configuration 200 of the heating rod assembly apparatus, in accordance with some embodiments. Configuration 200 illustrates thermal conductor 201, inert gas 202, inert gas tube 203, and pressure valve 204 (which can be part of pump 106). While the embodiments illustrate a single input 104 coupled to one thermal conductor 201, any number of inputs 104 and corresponding thermal conductors 201 may be used.

Configuration 200 illustrates pressure valve 204 (which can be part of pump 106) that injects the inert gas 202 via inert gas tube 203 into the housing or cladding sections 102a, 102b, and 102c. The inert gas 202 passes through the inert gas tube and fills the housing sections. The excess inter gas is released in a controlled manner via pressure valve 103. Pressure valve 103 is also used to remove all air in the housing as air is replaced with inert gas 202. The thermo-physical characteristics of inert gas 202 (e.g., He fluid) result in low specific volume and conductivity. As a result, the Helium absorbs and transports the thermal energy generated via the heater wires 201 much more quickly than traditional heaters and transfers that heat to the cladding material 102, ultimately facilitating a quicker transport of the energy generated within the heater to the outer cladding's surface.

In some embodiments, inert gas tube 202 is a temporary tube (or sacrificial tube) inserted to fill the heater-rod assembly with inert gas. In some embodiments, inert gas tube 202 is made of a material with high melting point. The material for the inert gas tube 202 include stainless steel (SS) 304, 316, and nickel alloy 625. The range of melting points for materials used for inert gas tube 202 ranges from 1300 degrees Celsius to 1450 degrees Celsius.

To fill the cladding 102 with gas, for example helium, a small (e.g., ⅛" DIA) tube 203 is inserted in and out of the top of the heater element from pressure boundary interface 101. The inlet tube 203 runs down through the length of the heater to the bottom and stops short of touching the bottom, for example by approximately 1 inch. It is left open at the end for the inert gas to fill the housing sections. The inlet of tube 203 is then connected to a high-pressure helium bottle (e.g., pump 106) via pressure valve 204 and regulated by pressure valve 103 via outlet 204. In some embodiments, high-pressure helium bottle is directly connected to the inlet of inert gas tube 203.

In some embodiments, pressure valve 103 (or needle valve) is fractionally left open when inert gas is pumped into the inlet (e.g., when the helium pressure tank is opened). Needle valve 103 has a regulating valve which is adjusted to produce a low flow system which delivers helium to the bottom of the heater and purges out of outlet 204 through needle valve 103. The flow is limited based on the needle valve's position and the pressure is maintained from the pressure tank 106 or pump 106 and regulating valve 103. In one example, an internal pressure of approximately 1000 psig is maintained with an adjustable flow rate between approximately 0.5 and 5 liters per minute (depending on the desired conditions).

Helium is purged to heat the outside of the cladding 102 as quickly as possible. Typical indirect heaters have electrical resistance wires of varying orientation placed within cladding and bonded with a ceramic material. The purpose of this is to hold the wire in to stabilize it and dissipate the heat uniformly. The problem with traditional heaters is that the ceramic is very thermally resistant and therefore it impedes the heat's ability to reach the cladding quickly, a necessity for certain applications of this device. Helium is a medium with low thermal resistivity and high electrical resistivity. While various embodiments are described with reference to helium, one skilled in the art will recognize that other inert gases or other heat transfer fluids may be used as an alternative to a solid ceramic.

In various embodiments, cladding 102 is pressurized with the helium to prevent crushing deformation of cladding 102 in high pressure environments. The end outcome is a heater design which can produce extremely high response rates at cladding 102, higher than any comparable devices currently available. In various embodiments, the pressure rating of heater assembly 100 is governed by several factors including: the thickness of cladding tube wall 102, pressure of the inert gas (e.g., helium), and heater operating temperature (e.g., temperature of the thermal conductor 201). As cladding wall thickness is increased (to increase pressure rating), the temperature transient rate (both upwards and downwards) decreases.

Thermal conductor 201 comprises a material with substantially zero infrared spectrum. Examples, of material with substantially zero infrared spectrum include sapphire, silica, or glass. Thermal conductor 201 formed as sapphire tubes, are semitransparent to infrared radiation which significantly increases the radiative heat transfer over the opaque ceramics. The sapphire has a higher thermal conductivity and lower specific heat capacity than the alumina providing increased conductive heat transfer and faster response time. Other materials for Thermal conductor 201 are those materials that have high melting points, high thermal conductivity or low thermal resistivity, and high electrical resistivity.

The range for high melting points is from 1400 C to 1800 C. The range for high thermal conductivity is 25 W/mK to 175 W/mK. The range for high electrical resistive is $1.45 \times 10E-6$ ohm-meters to $5.6 \times 10E8$ ohm-meters. An example for thermal conductor 201 is Kanthal A-1 which is a ferritic iron-chromium-aluminum alloy. The melting point of Kanthal A-1 is 1400 C, thermal conductivity is 27 W/mK, and electrical resistivity is $1.45 \times 10E-6$ ohm-meters. Other appropriate conductors for thermal conductor 201 include platinum which has a melting point of 1768 C, thermal conductivity of 71.6 W/mK and electrical resistivity of $1.07 \times 10E7$ ohm-meters. Tungsten is another appropriate material for thermal conductor 201 which has a melting point of 3420 C, thermal conductivity of 173 W/mK and electrical resistivity of $5.6 \times 10E8$ ohm-meters. At these power levels, small changes in some of these listed value result in large changes in performance.

In some embodiments, thermal conductor 201 is covered or cladded with another layer to protect the thermal conductor from an electrical short with a neighboring thermal conductor. In some embodiments, one or more pucks or stabilizers are coupled to the two or more thermal conductors to keep the two or more thermal conductors separated to avoid electrical short among the two or more thermal conductors 201, wherein the two or more thermal conductors are thermally coupled to the housing 102 via inert gas 202. In some embodiments, the one or more stabilizers comprises one of ceramic (e.g., alumina), sapphire, or thermoplastic polyester. In some embodiments, the thermoplastic polyester includes polylactic acid (PLA). In some embodiments, the one or more pucks comprises alumina (e.g., substantially 99.5% pure alumina). Replacing the PLA pucks with alumina pucks removes the need to backfill the heater rod internals with the ceramic compound, in accordance with some embodiments. This provides faster construction and more consistent heater rods and makes replacing different cladding materials much easier over previous designs. In some embodiments, thermal conductor 201 comprises ceramic tubes.

Thermal conductor 201 is connected to input 104, which in turn is coupled to pulse generator 105. Pulse generator 105 generates current and/or voltage pulses that cause the two or more thermal conductors to heat up. For example, pulse generator 105 generates 24 kW of DC power at 120 V/600 A with slew rates from 0.033 V/s to 240 V/ms. Given the heater rod acts as a resistive load, the maximum slew rates are capable of being reached which provide the appropriate power densities desired.

Figure 3B:
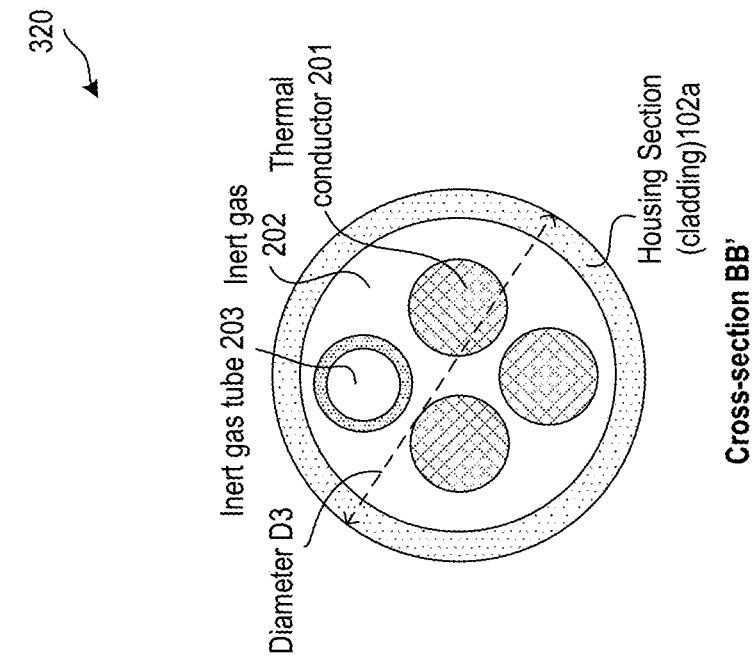
FIGS. 3A-B illustrate cross-sections, respectively, of the heating rod assembly apparatus, in accordance with some embodiments.
Figure 3A:
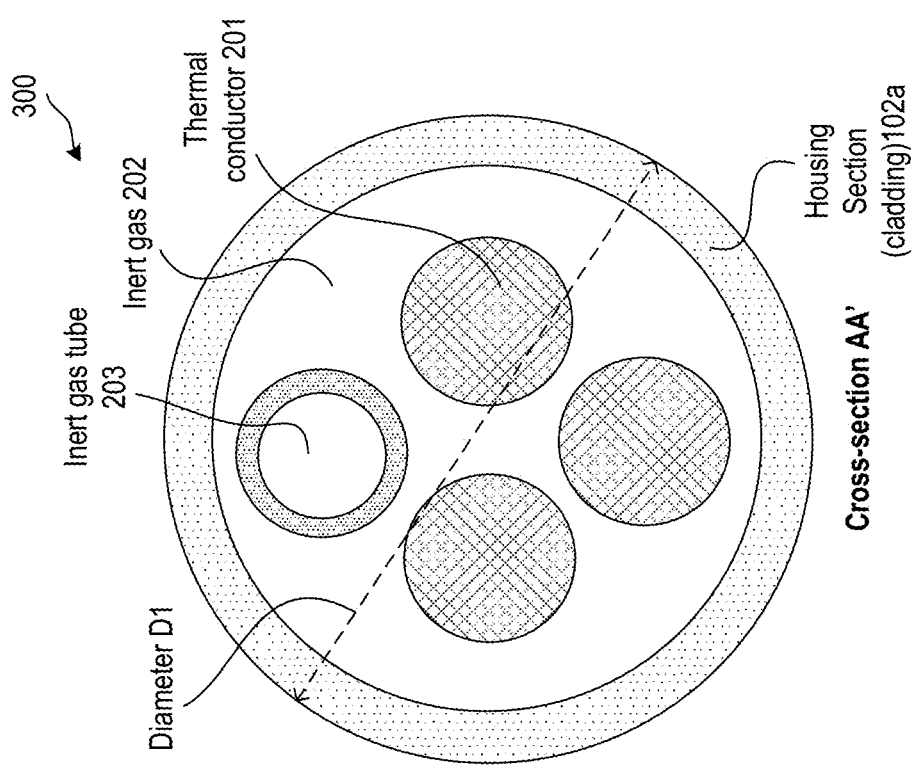

FIGS. 3A-B illustrate cross-sections 300 and 320, respectively, of the heating rod assembly apparatus, in accordance with some embodiments. Cross-section 300 is the cross-section AA' of the housing section 102a having diameter D1 while cross-section 320 is the cross-section BB' of the housing section 102c having diameter D3. Cross-section 300 is similar to cross-section 320 but for being larger. The tapered sections of housing 102a, 102b, and 102c continue the flow of the tubes or conductors through those sections. In some embodiments, at the discontinuities between the tapered sections, jogged tubes or thermal conductors are used to connect the respective tube or conductor from one housing section to the other. As the diameter of the section reduces, the heat density by the thermal conductor 201 increases. In various embodiments, thermal conductors 201 and tube 203 are separated from one another (to avoid shorting) by pucks. The range for diameters for thermal conductors 201 and tube 203 is 1.2 mm to 3.0 mm. In one example, the thermal conductors 201 and tube 203 are 16 gauge (e.g., 1.29 mm in diameter) with a maximum tube diameter of 3 mm. In another example, the thermal conductor 201 is 14 gauge (e.g., diameters 1.63 mm) with a maximum tube diameter of 2.10 mm. While the various embodiments are illustrated with round or cylindrical rods, the rods can be of any shape and length to simulate various heating conditions.

Figure 3C:
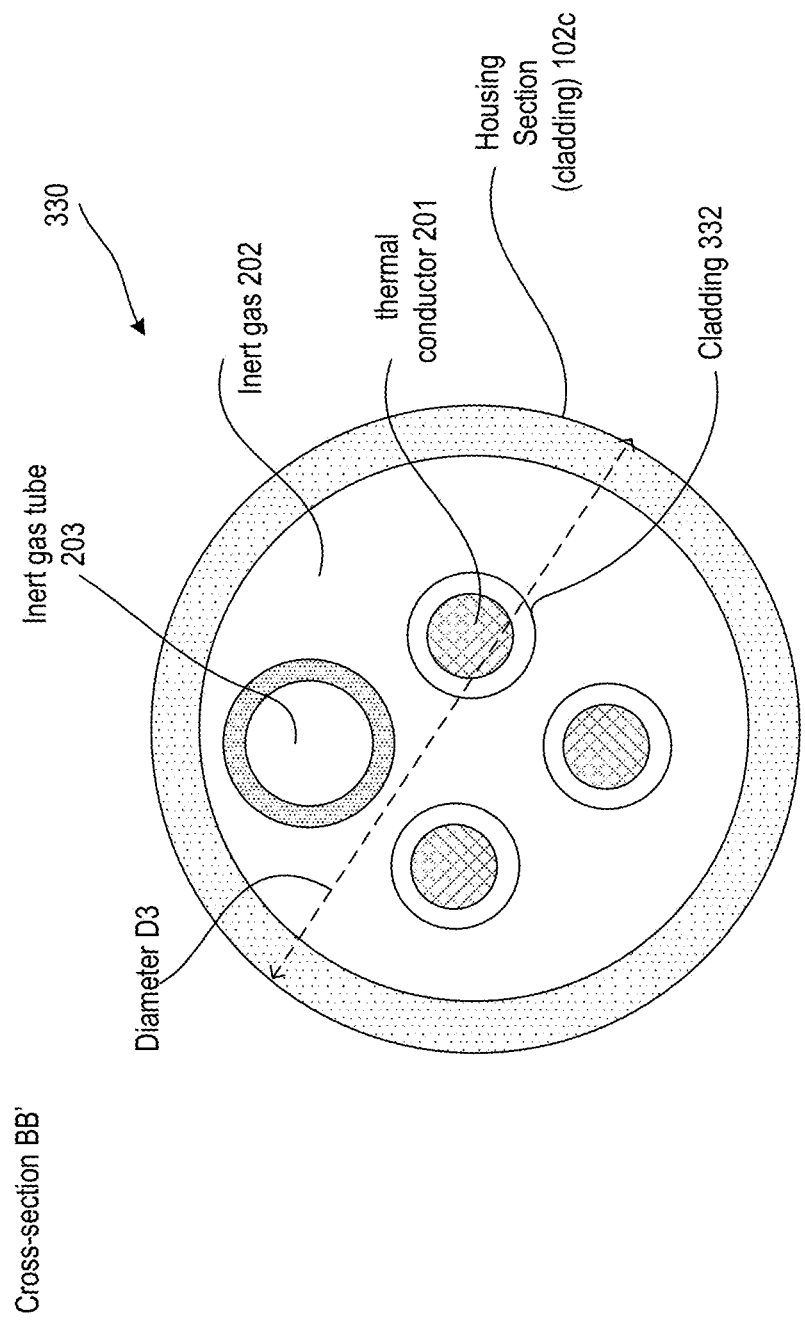
FIG. 3C illustrates a cross-section of the heating rod assembly apparatus, in accordance with some other embodiments.

FIG. 3C illustrates cross-section 330 of the heating rod assembly apparatus, in accordance with some other embodiments. Compared to cross-section 300, here the thermal conductors 201 are covered by a protective covering or cladding 332. In one example, protective covering or cladding 332 form sapphire tubes with interspersed ceramic spacers to maintain correct spacing of the conductors 201. In one example the wall thickness of the sapphire tubes is about 0.4 mm. The thickness of the tubes depends on the operating voltage and dielectric strength of the cladding 332 material to ensure that proper electrical insulation is provided between the conductors.

FIGS. 4A-B illustrate a section 400 of the heating rod assembly apparatus inside a stabilizer, and corresponding cross-sectional view 420, in accordance with some embodiments. In various embodiments, the two or more thermal conductors 201 and inert gas tube 203 are separated from one another by sections of stabilizers 401. These stabilizers 401 may be placed repeatedly throughout the various sections of cladding 102. In some embodiments, stabilizers 401 comprises pucks to keep the two or more thermal conductors 201 separated to avoid shorting, wherein the two or more thermal conductors are thermally coupled to the housing 102 via inert gas 202. In some embodiments, the pucks comprise thermoplastic polyester. In some embodiments, the thermoplastic polyester includes polylactic acid (PLA). In some embodiments, the pucks comprises alumina (e.g., substantially 99.5% pure alumina). Replacing the PLA pucks with alumina pucks removes the need to backfill the heater rod internals with the ceramic compound. This provides faster construction and more consistent heater rods and makes replacing different cladding materials much easier than over previous designs. In some embodiments, the stabilizer 401 comprises ceramic (e.g., alumina). Any material with good electrical resistance to provide insulation between the conductors while also maintaining integrity at high temperatures can be used for stabilizer 401. In one example, sapphire is used to also gain a small amount of thermal performance from the heaters. Material for stabilizer 401 is expected to be machined without breaking.

Figure 4C:
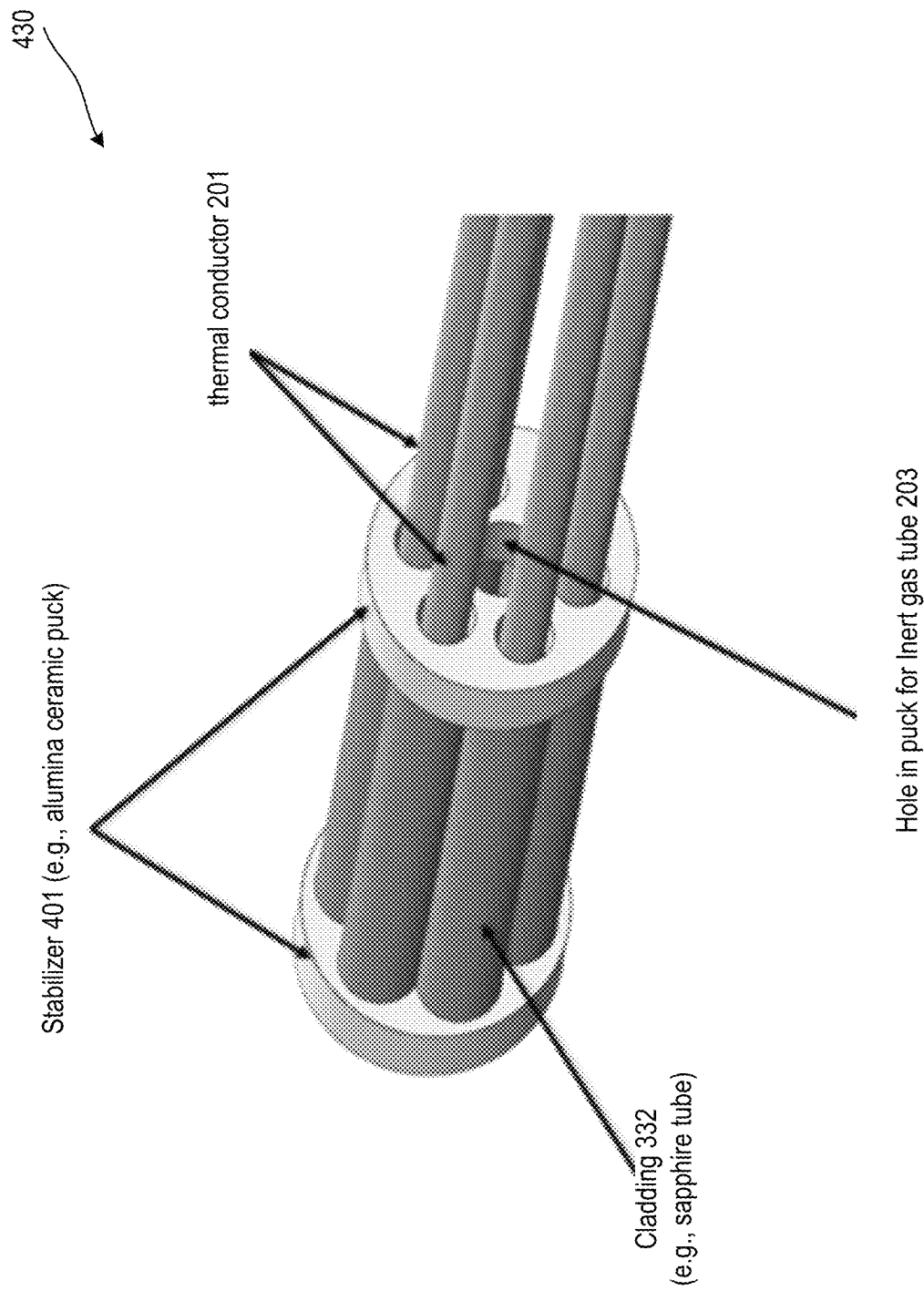
FIG. 4C illustrates another view of the heating rod assembly apparatus, in accordance with some embodiments.

FIG. 4C illustrates another view 430 of the heating rod assembly apparatus, in accordance with some embodiments. In this embodiment, architecture of FIG. 3C is used and arranged such that a hole for inert gas tube 203 is in the center of a puck and surrounded by thermal conductors 201.

Thermal conductors 201 are cladded with cladding 332 (e.g., sapphire tubes). Stabilizers 401 are repeated regularly through the length of the thermal conductors 201 to endure that the thermal conductors do not short.

Figure 5:
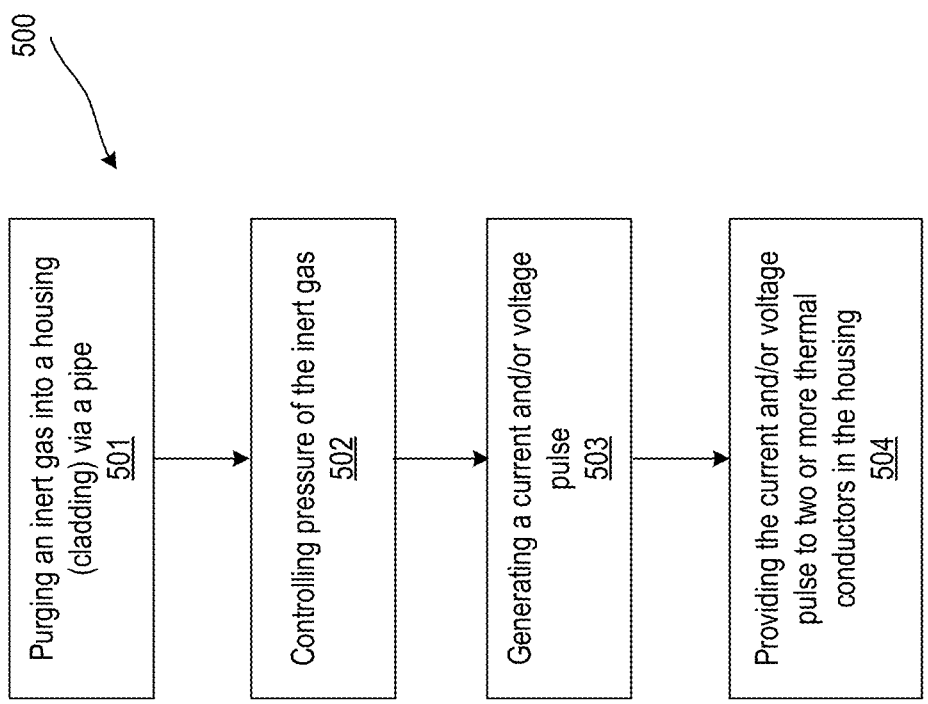
FIG. 5 illustrates a flowchart for operating the heating rod, in accordance with some embodiments.

FIG. 5 illustrates flowchart 500 for operating the heating rod, in accordance with some embodiments. While various blocks are shown in a particular order, the order can be modified. For example, in some embodiments, some blocks may be performed simultaneously while other blocks may be performed before others. At block 501, inert gas (e.g., He) is purged into cladding 102 via pipe 203. In some embodiments, prior to block 501, a desired cladding 102 is put on the heater-rod assembly.

At block 502, pressure valve 103 (or needle valve) is fractionally left open when inert gas is pumped into the inlet (e.g., when the helium pressure tank is opened). The helium is purged to heat the outside of the cladding 102 as quickly as possible. Needle valve 103 has a regulating valve which is adjusted to produce a low flow system which delivers helium to the bottom of the heater and purges out of outlet 204 through needle valve 103. The flow of inert gas 202 is limited based on the needle valve's position and the pressure is maintained from the pressure tank 106 and regulating valve 103. As such, pressure of inert gas 202 is controlled in housing 102.

At block 503, pulse generator 105 is turned on to generate pulses of current and/or voltage. These pulses are then applied to the two or more thermal conductors 201 at block 504. The pulses have exponential rise and slower drop off. In one example, pulse generator 105 generates 24 kW of DC power at 120 V/600 A with slew rates from 0.033 V/s to 240 V/ms. Given the heater rod acts as a resistive load, the maximum slew rates are capable of being reached which provide the appropriate power densities desired. The inert gas allows for the rapid heat transfer from the thermal conductors 201 to cladding 102. For example, 200 W/cm2 of heat energy is generated on cladding 102.

Figure 6:
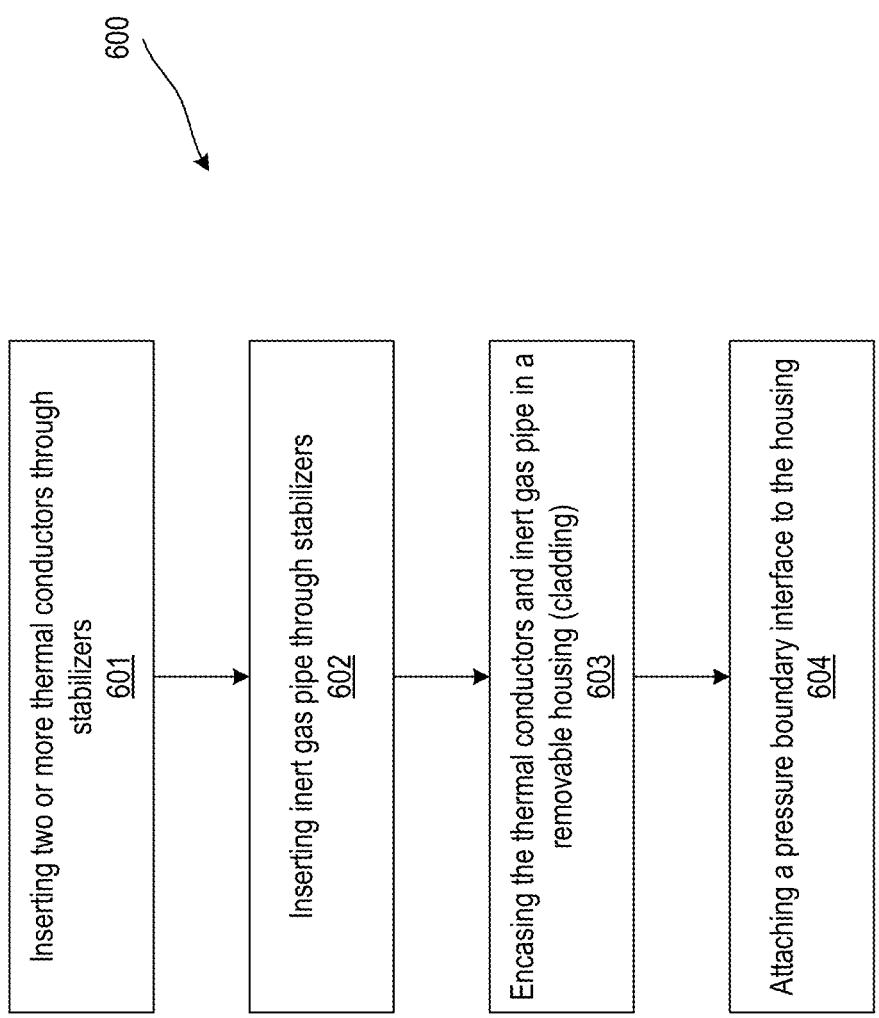
FIG. 6 illustrates a flowchart for assembling the heating rode, in accordance with some embodiments.

FIG. 6 illustrates flowchart 600 for assembling the heating rode, in accordance with some embodiments. While various blocks are shown in a particular order, the order can be modified. For example, in some embodiments, some blocks may be performed simultaneously while other blocks may be performed before others. At block 601, two or more thermal conductors 201 are inserted in stabilizers 401. Stabilizers 401 are used to keep the two or more thermal conductors 201 separated to avoid shorting. At block 602, gas pipe 203 is inserted through stabilizer 401. Depending the on the desired study or experiment, a particular cladding 102 is selected and applied to the heater-rod assembly as indicated by block 603. A pressure boundary interface 101 is then attached to the housing section 102c as indicated by block 604.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

Following examples are provided to illustrate the various embodiments. These examples can depend from one another in any suitable manner.

Example 1

A heater-rod comprising: a housing comprising a cladding material; two or more thermal conductors in the housing; and one or more stabilizers coupled to the two or more thermal conductors to keep the two or more thermal conductors separated to avoid electrical short among the two or more thermal conductors, wherein the two or more thermal conductors are coupled to the housing via an inert gas.

Example 2

The heater-rod of example 1, wherein the two or more thermal conductors comprise a material with substantially zero infrared spectrum.

Example 3

The heater-rod of example 2, wherein the material includes one of: sapphire, silica, or glass.

Example 4

The heater-rod of example 1, wherein the two or more thermal conductors are covered with a material with substantially zero infrared spectrum.

Example 5

The heater-rod of example 4, wherein the material includes one of: sapphire, silica, or glass.

Example 6

The heater-rod of example 1, wherein the inert gas comprises He.

Example 7

The heater-rod of example 1, wherein the one or more stabilizers comprises one of ceramic or thermoplastic polyester.

Example 8

The heater-rod of example 7, wherein the thermoplastic polyester includes polylactic acid.

Example 9

The heater-rod of example 1, wherein the cladding material includes one or more of: stainless steel, zirconium, nickel, iron, incoloy, or nickel-based alloy.

Example 10

The heater-rod of example 1, wherein the housing is removable.

Example 11

The heater-rod of example 1 comprises at least a first section and a second section with a first diameter and a second diameter, respectively, wherein the second diameter is shorter than the first diameter, and wherein the two or more thermal conductors pass through the first section and the second section.

Example 12

The heater-rod of example 11 comprises an interface coupled to the first section, wherein the two or more thermal conductors include a first thermal conductor and a second thermal conductor, wherein the interface comprises holes to access the first thermal conductor and second thermal conductor, and wherein the interface is to establish a pressure boundary for the first section and the second section.

Example 13

The heater-rod of example 1 comprises a pipe in the housing, wherein the pipe has a first opening and a second opening, wherein the first opening is to receive the inert gas, and wherein the second opening is to provide the inert gas in the housing.

Example 14

The heater-rod of example 1 comprises a pressure regulator to control pressure of the inert gas in the housing.

Example 15

An apparatus comprising: a pulse generator to generate a current and/or voltage pulse; a housing comprising a cladding material; two or more thermal conductors in the housing, wherein the two or more thermal conductors are to receive the current and/or voltage pulse from the pulse generator; one or more stabilizers coupled to the two or more thermal conductors to keep the two or more thermal conductors separated to avoid electrical short among the two or more thermal conductors, wherein the two or more thermal conductors are coupled to the housing via an inert gas; and a first section and a second section with a first diameter and a second diameter, respectively, wherein the second diameter is shorter than the first diameter, and wherein the two or more thermal conductors pass through the first section and the second section.

Example 16

The apparatus example 15, wherein the two or more thermal conductors comprise a material with substantially zero infrared spectrum.

Example 17

The apparatus of example 16, wherein the material includes one of: sapphire, silica, or glass.

Example 18

The apparatus of example 17, wherein the inert gas comprises He, wherein the one or more stabilizers comprises of one ceramic or thermoplastic polyester, and wherein the housing is removable.

Example 19

A method for radiating heat, the method comprising: purging an inert gas into a removable housing via a pipe, wherein the removable housing comprises cladding material; generating a current and/or voltage pulse; controlling pressure of the inert gas in the removable housing; and providing the current and/or voltage pulse to two or more thermal conductors in the removable housing.

Example 20

The method example 19, wherein the two or more thermal conductors comprise a material with substantially zero infrared spectrum.

Example 21

The method of example 20, wherein: the material includes one of: sapphire, silica, or glass; and the inert gas comprises He.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. A heater-rod comprising:
    a housing comprising a cladding material;
    two or more thermal conductors in the housing;
    one or more stabilizers coupled to the two or more thermal conductors to keep the two or more thermal conductors separated to avoid electrical short among the two or more thermal conductors, wherein the two or more thermal conductors are coupled to the housing via an inert gas; and
    at least a first section and a second section with a first diameter and a second diameter, respectively, wherein the second diameter is shorter than the first diameter, and wherein the two or more thermal conductors pass through the first section and the second section.
2. The heater-rod of claim 1, wherein the two or more thermal conductors comprise a material with substantially zero infrared spectrum.
3. The heater-rod of claim 2, wherein the material includes one of: sapphire, silica, or glass.

4. The heater-rod of claim 1, wherein the two or more thermal conductors are covered with a material with substantially zero infrared spectrum.

5. The heater-rod of claim 4, wherein the material includes one of: sapphire, silica, or glass.

6. The heater-rod of claim 1, wherein the inert gas comprises He.

7. The heater-rod of claim 1, wherein the one or more stabilizers comprises one of a ceramic or a thermoplastic polyester.

8. The heater-rod of claim 7, wherein the thermoplastic polyester includes polylactic acid.

9. The heater-rod of claim 1, wherein the cladding material includes one or more of: stainless steel, zirconium, nickel, iron, incoloy, or nickel-based alloy.

10. The heater-rod of claim 1, wherein the housing is removable.

11. The heater-rod of claim 1 comprises an interface coupled to the first section, wherein the two or more thermal conductors include a first thermal conductor and a second thermal conductor, wherein the interface comprises holes to access the first thermal conductor and the second thermal conductor, and wherein the interface is to establish a pressure boundary for the first section and the second section.

12. The heater-rod of claim 1 comprises a pipe in the housing, wherein the pipe has a first opening and a second opening, wherein the first opening is to receive the inert gas, and wherein the second opening is to provide the inert gas in the housing.

13. The heater-rod of claim 1 comprises a pressure regulator to control pressure of the inert gas in the housing.

14. An apparatus comprising:
- a pulse generator to generate a current and/or voltage pulse;
- a housing comprising a cladding material;
- two or more thermal conductors in the housing, wherein the two or more thermal conductors are to receive the current and/or voltage pulse from the pulse generator;
- one or more stabilizers coupled to the two or more thermal conductors to keep the two or more thermal conductors separated to avoid electrical short among the two or more thermal conductors, wherein the two or more thermal conductors are coupled to the housing via an inert gas; and
- a first section and a second section with a first diameter and a second diameter, respectively, wherein the second diameter is shorter than the first diameter, and wherein the two or more thermal conductors pass through the first section and the second section.

15. The apparatus of claim 14, wherein the two or more thermal conductors comprise a material with substantially zero infrared spectrum.

16. The apparatus of claim 15, wherein the material includes one of: sapphire, silica, or glass.

17. The apparatus of claim 16, wherein the inert gas comprises He, wherein the one or more stabilizers comprises of one a ceramic or a thermoplastic polyester, and wherein the housing is removable.

* * * * *